(No Model.)
2 Sheets—Sheet 1.

A. ROSENTHAL.
FEED CUTTER AND CORN HUSKER.

No. 546,390. Patented Sept. 17, 1895.

Witnesses.
A. H. Keeney
Anna V. Faust

Inventor.
August Rosenthal
By Benedict & Morsell
Attorneys.

(No Model.) 2 Sheets—Sheet 2.
A. ROSENTHAL.
FEED CUTTER AND CORN HUSKER.
No. 546,390. Patented Sept. 17, 1895.
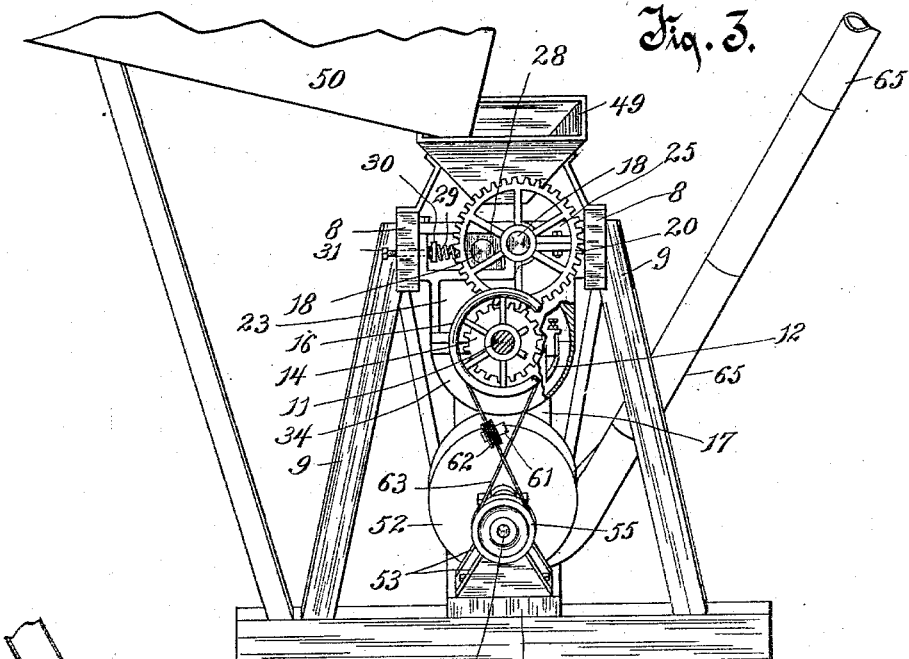
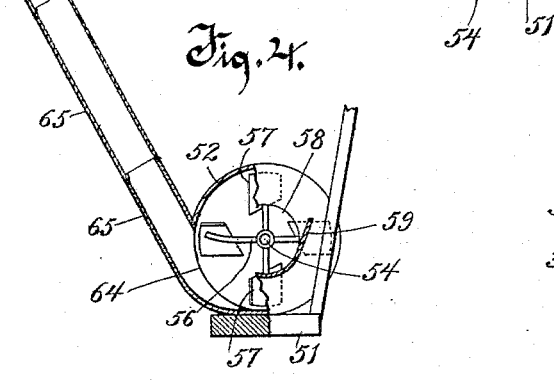
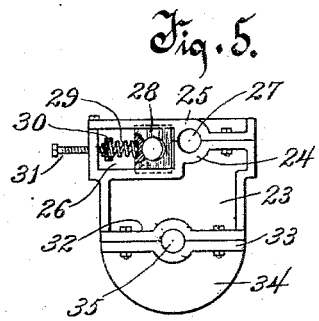
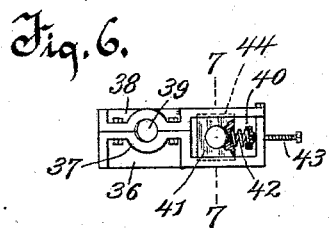
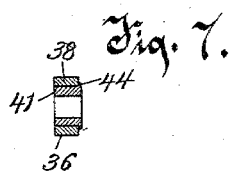
Witnesses:
C. J. Keeney
Anna V. Faust
Inventor:
August Rosenthal
By Benedict & Morsell
Attorneys

UNITED STATES PATENT OFFICE.

AUGUST ROSENTHAL, OF REEDSBURG, WISCONSIN.

FEED-CUTTER AND CORN-HUSKER.

SPECIFICATION forming part of Letters Patent No. 546,390, dated September 17, 1895.

Application filed January 24, 1895. Serial No. 536,045. (No model.)

*To all whom it may concern:*

Be it known that I, AUGUST ROSENTHAL, of Reedsburg, in the county of Sauk and State of Wisconsin, have invented a new and useful Improvement in a Combined Feed-Cutter and Corn-Husker, of which the following is a description, reference being had to the accompanying drawings, which are a part of this specification.

My invention has relation to improvements in combined feed-cutters and corn-huskers, having particular reference to the means employed for carrying the fodder upwardly from the machine as the ears of corn are cut and also as the husks are removed.

The improvements are shown in connection with a form of machine such as that covered in my application for Letters Patent, Serial No. 507,380, filed April 13, 1894, and allowed January 2, 1895.

In the class of feed-cutters and corn-huskers most commonly in use the fodder is carried up by means of an endless belt.

It is the object of my invention to accomplish the same result that the endless belts accomplish with much less mechanism and much more rapidly.

The construction comprehends the devices and parts or their equivalents, as hereinafter more fully set forth.

Figure 1:
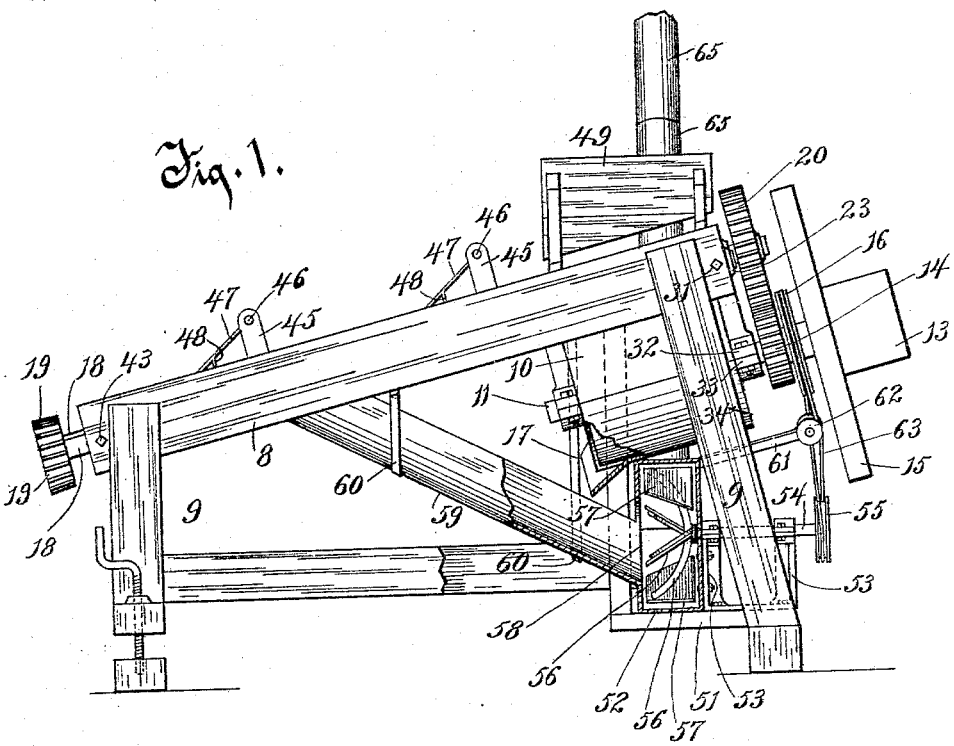
Figure 2:
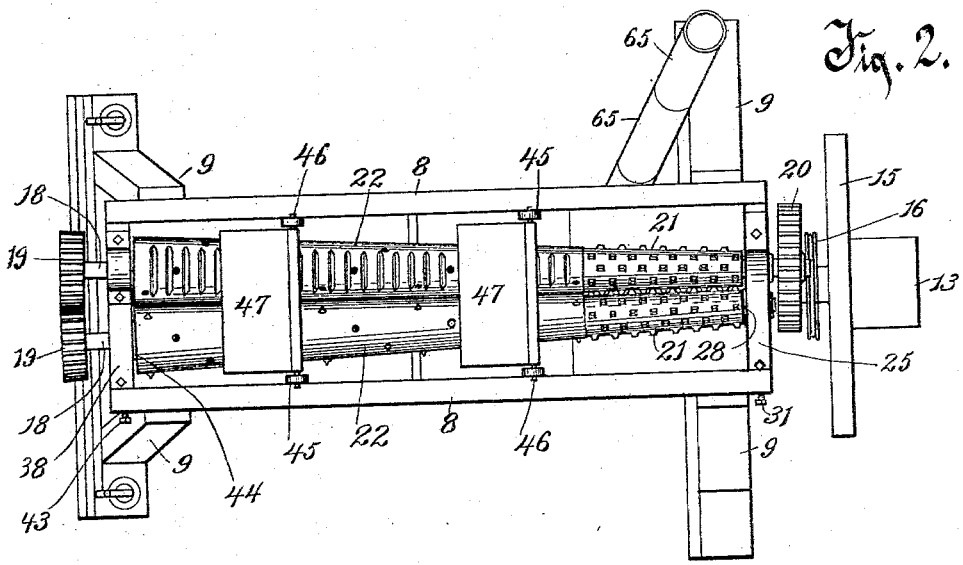

In the accompanying drawings, Figure 1 is a side elevation of a device embodying my improvements, parts being broken away. Fig. 2 is a plan view of Fig. 1. Fig. 3 is an elevation of the front end of the machine. Fig. 4 is a detail of the fan-casing, showing the pipe leading therefrom, part of said casing being broken away and the pipe shown in section. Fig. 5 is a detail of the bearings at the front end of the machine. Fig. 6 is a detail of the bearings at the rear end of the machine, and Fig. 7 is a transverse section on the line 7 7 of Fig. 6.

Like numerals of reference denote like parts throughout the several views.

Referring to the drawings, the numeral 8 indicates the upper portion of the frame of the machine supported upon suitable legs 9.

Suspended beneath the front end of the upper portion of the frame is a casing 10, and extending into this casing is a shaft 11, said shaft carrying thereon within the casing a series of cutting-knives 12. The outer end of the shaft 11 is provided with a band-wheel 13 and also carries a gear-wheel 14, and between this gear-wheel and the band-wheel is located a grooved pulley 16. The inner end of the knife-casing is provided with an opening, and projecting beyond this opening is a spout 17.

Journaled in the ends of the upper rectangular portion 8 of the frame are shafts 18 18. The rear projecting ends of these shafts carry intermeshing gear-wheels 19 19, while one of the shafts 18 has mounted rigidly upon its front end a gear-wheel 20, which meshes with the gear-wheel 14 of shaft 11. By this arrangement of gearing it will be apparent that as the shaft 11 is rotated the cutting-knives revolve therewith, while rotation at the same time is imparted to one of the longitudinal shafts 18, and this shaft in turn imparts rotation in an opposite direction to the other shaft 18 by reason of the intermeshing gears 19 19.

The longitudinal shafts 18 18 have formed or mounted rigidly thereon long tapering rollers, the tapers gradually diminishing toward the front end of the machine. The smaller front ends 21 21 are designed for separating the ears of corn from their stalks, while the longer portions 22 22 of the rollers are for the purpose of husking the ears of corn.

Inasmuch as the cornstalks are fed to the portions 21 of the rollers at an incline, it is necessary to provide a construction which will permit the stalks so fed to readily pass between the rollers. It is for this reason that I provide the form of journal-bearings illustrated in Figs. 5 and 6. The journal-bearings illustrated in Fig. 5 are those at the front end of the machine. In this figure the numeral 23 indicates a casting, which is provided at its upper end with an irregular flange 24, forming the lower half of the top journal-box for the two longitudinal shafts. The upper half of this box is formed by a cap 25. It will be seen that when the parts are adjusted together a rectangular opening 26 is formed and a circular opening 27. In the rectangular opening is fitted a block 28, said block being provided upon one side with a recess which receives one end of a spring 29, while the opposite end of the spring is received in a recessed plate 30, carried by an adjusting-screw 31. The front end of one of the longitudinal shafts 18 is fitted in the circular opening 27, while the front end of the other longitudinal shaft is fitted in the opening of the block 28. This latter shaft, therefore, will be on a plane somewhat lower than the plane of its companion shaft. By means of the spring and adjusting-screw it is evident that the rollers may be held yieldingly in close proximity. At the lower end of the casting 23 is formed a flange 32, against the under side of which is adapted to be fittted the flange 33 of another casting 34, whereby a circular journal-bearing 35 is formed. In this bearing is journaled one end of the shaft 11, while the other end of said shaft is journaled in a suitable bearing at the end of the knife-casing.

As will be seen by reference to Fig. 6, the bearings for the rear ends of the shafts 18 18 are exactly similar to the front bearings, the casting in this instance being indicated by the numeral 36, the flange thereof by the numeral 37, the upper cap by the numeral 38, the circular bearing-aperture by 39, the rectangular opening by 40, the block by 41, the spring by 42, and adjusting-screw by 43.

In Fig. 7 the block 41 is shown as provided with shoulders 44, which prevent said block from working outwardly through the opening. The block 28 at the front end of the machine is of course provided with similar shoulders.

Extending upwardly from opposite sides of the frame 8 are arms 45, the upper ends of said arms forming journal-bearings for transverse shafts 46 46, from which shafts plates 47 47 extend downwardly to the husking portions of the rollers, said plates in turn having projecting down vertically from their under sides transverse lugs 48 48, the distance between the lower edges of these lugs and the husking portions of the rollers being sufficient only to admit of the passage of a single row of the ears of corn.

Above the front end of the frame 8 is supported a hopper 49, and leading to this hopper is a feeding-chute 50.

The above description covers a machine similar to that described in my application for Letters Patent above referred to, excepting a slight difference in the construction of the end journal-bearings, and also in the provision of the grooved pulley 16 on the shaft 11 and the spout 17 leading from the opening of the knife-casing.

Supported upon a platform 51 is a fan-casing 52; also, supported upon this platform outside of the fan-casing are standards 53 53, the upper ends of which form bearings for a shaft 54. Upon the outer end of this shaft is mounted a grooved pulley 55, while the inner end of the shaft extends into the fan-casing and is provided with a series of radial concave arms 56, the concavities being toward the rear. At the ends of these arms are secured wings 57, said wings having their inner edges beveled forwardly, so that at the rear as large a space as possible is formed in the fan-casing, while at the front the wings have their greatest area in order to get the full effect of the wind. The rear side of the fan-casing is provided with an opening 58, to which opening a trough 59 leads, the upper end of said trough extending upwardly to the frame 8, being supported near its upper end by means of a hanger 60.

Projecting from the front of the fan-casing is an arm 61, in the outer end of which is mounted a guide-pulley 62. The grooved pulleys 16 and 55 are connected by means of a crossed belt 63. As the grooved pulley 16 is mounted upon the inclined shaft 11, it is necessary that the belt should be properly guided to the pulley 55, and for this purpose the pulley 62, above referred to, is provided, which engages one strand of the crossed belt.

The perimeter of the fan-casing is provided with an opening 64, and to this opening connects a pipe composed of a series of sections 65. This pipe is quite analogous in construction to an ordinary stovepipe, and can consequently be lengthened and shortened without difficulty merely by adding to or taking away sections thereof. Its course may also be deflected by the provision of suitable elbows.

In operation, the cornstalks are placed in the chute 50 and are fed therefrom into the hopper 49, the stalks passing between the portions 21 21 of the rollers and being cut up by the revolving knives within the casing beneath, while the ears of corn are broken from the stalks. These ears with the husks attached fall lengthwise on the rollers, and by reason of the inclination of the frame 8 slide down to the husking portions 22 22 of the rollers, and are discharged therefrom at the lower end thereof, having in the meantime been stripped of their husks. The stalks, which are forced between the portions 21 of the rollers and are cut up by the action of the revolving knives, are discharged from the knife-casing by the spout 17 into the trough 59, and are conducted by said trough into the fan-casing. The husks, which pass between the portions 22 22 of the rollers, fall into the trough 59 and are conducted directly thereby to the fan-casing. The fan-shaft 54 is revolved in the manner clearly shown, and by the consequent rotation of the fan a strong draft of air is created up the pipe, which carries with it the stalks and husks and elevates them to the desired place for deposit.

Having thus described my invention, what I claim, and desire to secure by Letters Patent, is—

1. The combination, of a frame having rollers journaled therein adapted for separating the ears of corn from their stalks, the stalks adapted to pass between the rollers, a fan casing secured to the frame beneath the rollers, said casing having an inlet and an outlet opening, a rotatable fan within said fan casing, a casing beneath the rollers for receiving the corn stalks therein, said casing provided with a discharge opening, mechanism within this casing for cutting the corn stalks, said cut stalks passing out of the discharge opening to the fan casing, and a conduit extending from the fan casing to the point of delivery, the cut corn stalks adapted to be forced up the conduit by the air draft created by the fan, substantially as set forth.

2. The combination, of a frame having rollers journaled therein, said rollers adapted for separating the ears of corn from their stalks, and for husking said ears of corn, the stalks passing between the rollers at one point, and the husks at another point, a fan casing secured to the frame beneath the rollers, said casing having an inlet and an outlet opening, a rotatable fan within the casing, a conduit leading from the husking portion of the rollers to the inlet opening of the fan casing, a casing beneath that portion of the rollers between which the stalks pass, said casing provided with a discharge opening, mechanism within the casing for cutting the corn stalks, said cut stalks passing out of the discharge opening to the fan casing, and a conduit extending from the fan casing to the point of delivery, the husks and cut corn stalks adapted to be forced up the conduit by the air draft created by the fan, substantially as set forth.

In testimony whereof I affix my signature in presence of two witnesses.

AUGUST ROSENTHAL.

Witnesses:
ARTHUR L. MORSELL,
ANNA V. FAUST.